Patented Nov. 14, 1939

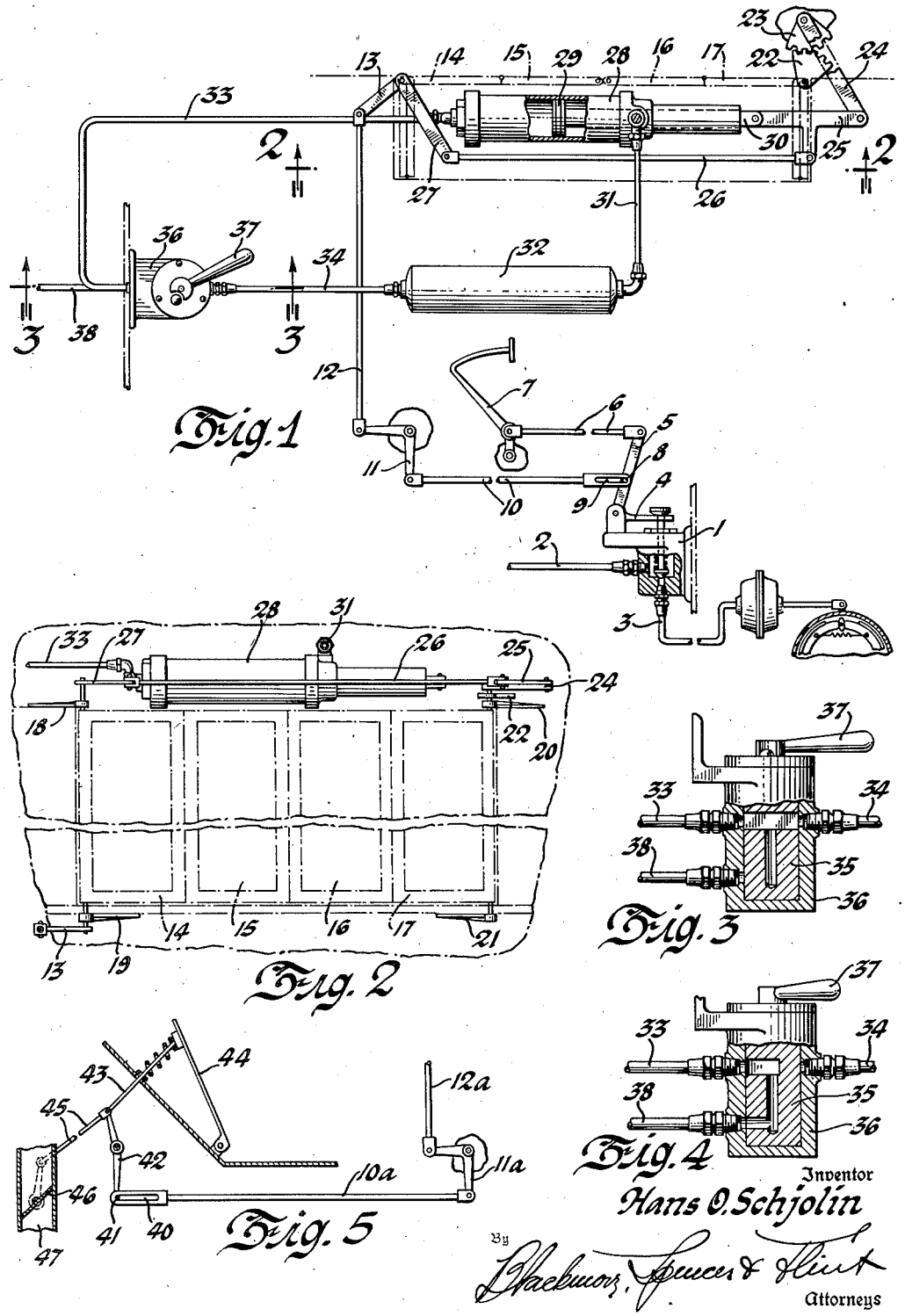

2,179,704

UNITED STATES PATENT OFFICE

2,179,704
DOOR AND BRAKE INTERLOCK

Hans O. Schjolin, Pontiac, Mich., assignor to Yellow Truck & Coach Manufacturing Company, Pontiac, Mich., a corporation of Maine Application October 20, 1938, Serial No. 236,000

8 Claims. (Cl. 303—6.1)

This invention relates to safety devices for passenger conveyances and more particularly to an improved arrangement to guard against accidental movement of a vehicle when a door is opened for the loading and unloading of passengers.

An object of the invention is to provide between the door and the vehicle control mechanism a simplified type of mechanical interlock consisting of motion transmitting linkage which will be inexpensive to manufacture and install and positive and carefree in operation. By vehicle control mechanism is meant any agency for controlling motion of the vehicle, such as the vehicle braking system with which the linkage cooperates, not to interfere with operator control in the usual fashion while the door is closed but to take control away from the operator and apply the brakes automatically when the door is open so as to hold the vehicle stationary and thereby safeguard against injury to passengers entering and leaving the vehicle.

Additional objects and advantages will become apparent during the course of the following specification having reference to the accompanying drawing wherein Figure 1 is a diagrammatic layout showing interconnecting linkage between the door and an air brake system; Figure 2 is a fragmentary view showing door operating mechanism in elevation; Figures 3 and 4 are detail sectional views of the door control valve taken as on line 3—3 in Figure 1 with the parts in different positions of adjustment, and Figure 5 is a diagrammatic representation of the system as applied to the engine fuel feed mechanism.

In the drawing the vehicle control mechanism and door assembly illustrated are of well known conventional types. In the ordinary air brake system a valve under control of a foot pedal normally vents the brake applying cylinder and upon pedal depression feeds air under pressure to the brake operating device. For the sake of simplicity there is merely shown in the drawing a spring pressed poppet valve contained within the casing 1 and controlling communication between the pressure line 2 and the conduit 3 leading to the brake applying device. The stem of the valve has an abutment for engagement with the leg 4 of a valve control device or bell crank lever pivotally mounted on the valve casing 1 and connected through its other leg 5 by a link 6 to a foot pedal 7. Depression of the foot pedal 7, therefore, operates the valve control lever to open the valve and allow communication between the pressure line 2 and brake line 3.

The control lever 5 carries a pin 8 slidable within a slot 9 formed in one end of a link 10 and constituting a lost motion connection which offers no interference to the movement of the lever 5 under control of the brake pedal. The opposite end of the link 10 is joined by a swinging bell crank 11 to a transverse link 12 which terminates in a pivotal connection with the swinging lever 13 keyed or fixed on the door hinge pin so as to swing with the door during door opening and closing movements. The door may consist of interpivoted sections 14 and 15 and interpivoted sections 16 and 17. The section 14 is provided with upper and lower hinge pins mounted in brackets 18 and 19, the lowermost hinge pin carrying the operating lever 13 before-mentioned. Similarly the section 17 is journaled at the top and bottom in brackets 20 and 21 and the uppermost hinge pin in this instance carries a gear segment 22 in mesh with the gear segment 23 journaled in a fixed portion adjacent the door frame. Rigid with the segment 23 is a swinging lever 24, whose free end is joined to a link 25. A lateral arm of the link 25 is connected by a tie rod 26 to a swinging lever 27 fixed to the upper hinge pin of the door section 14 so that the movement of the door sections occurs in unison.

For operating the doors a differential piston engine may be employed involving the piston cylinder 28 and piston 29, the latter having a rod 30 projecting through the cylinder for connection with the door operating link 25. The cylinder 28 on the small side of the piston communicates at all times through a conduit 31 with an air storage tank 32, while the opposite end of the cylinder 28 communicates with the storage tank 32 through the conduits 33 and 34 under control of a manually actuated valve 35 contained in the valve casing 36 and provided with an operating handle 37. In the door closing position of the valve, as seen in Figure 3, the valve porting connects the conduits 33 and 34, while in the door opening position of the valve the porting closes the conduit 34 and vents the conduit 33 through the exhaust conduit 38. In the vented position of the parts the air under pressure acting only on the small side of the piston 29 shifts the piston and through the linkage causes the doors to swing to open position. Simultaneously the hinge pin connected arm 13 operates through the linkage 10, 11 and 12 and actuates the brake valve control lever 5 for setting the brakes automatically wherefore movement of the vehicle is resisted.

In the arrangement shown in Figure 5 the door operated link 12a is connected through the bell crank 11a with the link 10a and the last mentioned link terminates in a head provided with the slot 40 receiving a pin 41 constituting a lost motion connection with a lever 42. The lever 42 in turn is joined to the plunger 43 associated with the accelerator pedal 44 and joined through the link 45 with the throttle valve 46 in the engine intake manifold 47. When the door is closed the position of the parts is that shown in Figure 5 and operation of the accelerator pedal 44 to open and close the throttle valve 46 occurs with the pin 41 moving freely in the slot 40. However, when the door is open the clearance in the slot is taken up automatically and the pin 41 bearing on the head of the link 10a resists depression of the accelerator pedal 44 and maintains the throttle in closed or idling position. In the idle position the torque of the engine will be insufficient to initiate vehicle movement and, consequently, passengers may pass through the door with assurance that the vehicle will remain stationary.

I claim:

1. In a motor vehicle having a door, vehicle control mechanism, a control member therefor, manually actuated means directly connected to said member for its operation, motion transmitting linkage connected at opposite ends to the door and control member, respectively, for member operation automatically when the door is opened and a lost motion device associated with the linkage to allow manual actuation of the control member when the door is closed.

2. In a motor vehicle having a door, an air brake valve operating lever, a manually operated member directly connected to said lever, and door operated means for actuating said lever including a lever movable with the door and motion transmitting linkage connecting and moving said levers one from the other and having therein a lost motion connection to accommodate brake applying movement of the manually operated lever.

3. In a motor vehicle having a door, a manually operated engine control device, mechanical motion transmitting linkage interconnecting the door and control device to shift the control device to given position with door movement to open position, said interconnection including means to render the same ineffective when the door is in closed position.

4. For use with a motor vehicle, a valve controlling fluid flow in connection with vehicle operation, manually operated valve setting means, additional valve setting means including mechanical linkage interconnecting the valve with a vehicle door for the direct transmission of door movement to said valve.

5. In a motor vehicle, vehicle operation control mechanism, a movable controller therefor, a manually actuated member directly connected to said controller and door operated linkage connected with the controller and including a lost motion device to render the controller responsive to manual operation when the linkage is in door closing position and to shift the controller to predetermined setting automatically with linkage travel to door opening position.

6. In combination, vehicle control mechanism, an actuating member therefor under control of the vehicle operator, additional actuating means independent of operator control including mechanical linkage operatively associated at one end with said mechanism and a door operatively connected to the other end of the linkage for the automatic actuation of said mechanism in response to door movement.

7. In combination, mechanism for controlling vehicle operation, manually operated means for actuating said mechanism, and vehicle door operated linkage mechanically connected with said means to transmit door movement thereto for operation with the door.

8. The combination with vehicle decelerating mechanism and a door assembly, of drag linkage directly connecting the decelerating mechanism with the door assembly to move the same to decelerating position coincident with door opening movement.

HANS O. SCHJOLIN.